US012692963B2

(12) United States Patent
Chen

(10) Patent No.: US 12,692,963 B2
(45) Date of Patent: Jul. 28, 2026

(54) FLUID CONNECTOR AND FEMALE-END VALVE STEM, FEMALE-END STRUCTURE, AND MALE-END PISTON THEREOF

(71) Applicant: SHENZHEN ENVICOOL SMART CONNECTION TECHNOLOGY CO., LTD., Shenzhen (CN)

(72) Inventor: Gang Chen, Shenzhen (CN)

(73) Assignee: SHENZHEN ENVICOOL SMART CONNECTION TECHNOLOGY CO., LTD., Shenzhen (CN)

( * ) Notice: Subject to any disclaimer, the term of this patent is extended or adjusted under 35 U.S.C. 154(b) by 20 days.

(21) Appl. No.: 18/854,522

(22) PCT Filed: Nov. 29, 2022

(86) PCT No.: PCT/CN2022/135133
§ 371 (c)(1),
(2) Date: Oct. 5, 2024

(87) PCT Pub. No.: WO2023/193454
PCT Pub. Date: Oct. 12, 2023

(65) Prior Publication Data
US 2025/0251071 A1 Aug. 7, 2025

(30) Foreign Application Priority Data
Apr. 8, 2022 (CN) .......................... 202210368037.4

(51) Int. Cl.
*F16L 37/32* (2006.01)
*F16L 37/23* (2006.01)

(52) U.S. Cl.
CPC ............... *F16L 37/32* (2013.01); *F16L 37/23* (2013.01)

(58) Field of Classification Search
CPC ........... F16L 37/32; F16L 37/34; F16L 37/23
See application file for complete search history.

(56) References Cited

U.S. PATENT DOCUMENTS 6,158,717 A 12/2000 Van Scyoc et al.
9,032,997 B2 * 5/2015 Abura ..................... F16L 37/28
251/149.6

(Continued)

FOREIGN PATENT DOCUMENTS

CN 202007936 U 10/2011
CN 103557392 A 2/2014

(Continued)

OTHER PUBLICATIONS

Machine translation CN215908622U (Year: 2022).*

(Continued)

*Primary Examiner* — Michael R Reid
(74) *Attorney, Agent, or Firm* — Yue (Robert) Xu; Apex Attorneys at Law, LLP

(57) ABSTRACT
The application provides a female-end valve stem of a fluid connector, a female-end structure of a fluid connector, a fluid connector including a male-end structure, and a male-end piston of a fluid connector. The female-end valve stem of the fluid connector includes a female-end rear stem part and a female-end front column part arranged at a front end of the female-end rear stem part, wherein a flattered part is provided at a rear end of the female-end rear stem part and configured to guide a flow forward.

17 Claims, 3 Drawing Sheets

(56) References Cited

U.S. PATENT DOCUMENTS

| | | | | |
|---|---|---|---|---|
| 9,791,087 B2 * | 10/2017 | Boothe | ............... | F16L 55/1015 |
| 10,247,341 B2 * | 4/2019 | Liu | ......................... | F16L 37/23 |
| 12,565,957 B2 * | 3/2026 | Cao | ......................... | F16L 35/00 |
| 2018/0003324 A1 | 1/2018 | Dinh | | |
| 2020/0032942 A1 | 1/2020 | Tiberghien et al. | | |

FOREIGN PATENT DOCUMENTS

| | | |
|---|---|---|
| CN | 203571282 U | 4/2014 |
| CN | 205842046 U | 12/2016 |
| CN | 208589582 U | 3/2019 |
| CN | 209385846 U | 9/2019 |
| CN | 110778829 A | 2/2020 |
| CN | 112128493 A | 12/2020 |
| CN | 112856075 A | 5/2021 |
| CN | 215294036 U | 12/2021 |
| CN | 215908622 U | 2/2022 |
| CN | 114593296 A | 6/2022 |
| CN | 218063865 U | 12/2022 |

OTHER PUBLICATIONS

International Search Report for PCT/CN2022/135133 mailed Jan. 28, 2023, ISA/CN.
CNIPA First Office Action corresponding to Application No. 202210368037.4; Issued date of Sep. 20, 2024.
European Search Report issued on Apr. 28, 2026 for European counterpart application No. 22936380.9.

\* cited by examiner

FLUID CONNECTOR AND FEMALE-END VALVE STEM, FEMALE-END STRUCTURE, AND MALE-END PISTON THEREOF

The application is a National Phase entry of PCT Application No. PCT/CN2022/135133, filed on Nov. 29, 2022, which claims the priority of the Chinese Patent Application No. 202210368037.4, titled "FLUID CONNECTOR AND FEMALE-END VALVE STEM, FEMALE-END STRUC-TURE, AND MALE-END PISTON THEREOF", filed on Apr. 8, 2022 with the China National Intellectual Property Administration, both of which are incorporated herein by reference in its entirety.

FIELD

The application relates to the technical field of pipe connection, more specifically, to a female-end valve stem of a fluid connector, a female-end structure including the female-end valve stem, a fluid connector including the female-end structure and, a male-end piston of the fluid connector.

BACKGROUND

At present, with the progress of society as well as the development of science and technology, the Internet of everything requires higher and higher computing speed for various kinds of chips, resulting in increasing demand for heat dissipation of chips. The traditional air-cooled heat dissipation has been unable to meet the heat dissipation demand, and various kinds of new fluid heat sinks will soon become the mainstream. The fluid connector is an interface between the fluid source and various chip heat sinks.

The fluid connector in the art includes a male end and a female end. When the fluid source is disconnected, the male end and the female end are individually sealed to prevent fluid leakage or ejection. When the male end and the female end are inserted into or engaged with each other, the respective sealing structures may be opened, so that the fluid source and the heat sink are connected and the fluid is circulated to take away the heat, thereby achieving efficient heat dissipation.

When the fluid flows from the input end through variable diameter flow channel to the output end in different directions, the pressure may be dropped. Pressure drop means that the heat dissipation efficiency is reduced. In the liquid cooling industry, which requires higher and higher heat dissipation efficiency, it is increasingly attracting attention in the art to reduce the loss of pressure drop from the input end to the output end and to improve the efficiency of heat dissipation. Thus, it is currently desired for those skilled in the art to effectively solve the problem of poor flow guide effect at connection of the rear end of the female-end stem.

SUMMARY

In view of the above, a first object of the present application is to provide a female-end valve stem of a fluid connector which can effectively solve the problem of poor flow guide effect at connection of the rear end of the female-end stem; a second object of the present application is to provide a female-end structure including the female-end valve stem; a third object of the present application is to provide a fluid connector including the female-end structure; and a fourth object of the present application is to provide a male-end piston of the fluid connector.

To achieve the first object, the present application provides the following solutions.

A female-end valve stem of a fluid connector includes a female-end rear stem part and a female-end front column part arranged at a front end of the female-end rear stem part. A flattened part is provided at a rear end of the female-end rear stem part and configured to guide a flow forward.

In use of the female-end valve stem of the fluid connector, since the female-end rear stem part is provided with the flattened part so that the both side surfaces of the flattened part in the thickness direction may be used for flow guiding and the both sides of the flattened part in the width direction may be used for fixing, the connecting positions on both sides in the width direction do not interfere with the flow of the fluid, thereby wholly ensuring the fluid flow performance. Therefore, by providing the flattened part with the two side surfaces in thickness direction for flow guiding and the two side edges in the width direction for fixing to the female-end body, this female-end valve stem has a very good flow guiding effect while ensuring fixation. In summary, the female-end valve stem of the fluid connector is able to effectively solve the problem of poor flow guiding effect at connection of the rear end of the female-end valve stem.

Preferably, mating cambered surfaces are formed on the both sides of the flattened part in the width direction and at a rear side of the support ribs. The mating cambered surfaces are located on a same cylindrical surface and located at both ends in a radial direction respectively, and are coaxial with the female-end front column part.

Preferably, a portion of the flattened part at a front side of the support ribs has a width gradually decreased and a constant thickness.

Preferably, the flattened part has flat surfaces on both sides in a thickness direction, which are gradually close to each other in a rearward direction until they meet.

Preferably, an annular groove is provided on a side surface of the female-end front column part to receive a sealing ring.

To achieve the second object, the present application further provides a female-end structure. The female-end structure includes the female-end valve stem mentioned above, a female-end body, a female-end valve sleeve and a female-end elastic member. The support rib of the female-end valve stem is connected to the female-end body. A female-end interface annular gap is formed between the female-end front column part of the female-end valve stem and an interface of the female-end body. The female-end valve sleeve is movably arranged in the female-end body and connected to the female-end body via the female-end elastic member. The female-end valve sleeve has a sealing part matched with the female-end interface annular gap. Since the female-end valve stem has the advantages mentioned above, the female-end structure including the female-end valve stem also has the corresponding advantages.

Preferably, the mating cambered surfaces on the both sides of the flattened part of the female-end valve stem are in contact fit with an inner wall surface of the female-end body, and are centered by the contact fit.

Preferably, the female-end body includes a rear cap part and a butt tube detachably connected to the rear cap part. The butt tube is provided with an interface. The female-end valve sleeve is disposed in the butt tube, and a front end of the rear cap part is arranged on the butt tube. The support ribs are fixedly clamped between a cap bottom of the rear cap part and the butt tube. A flow guiding channel is provided at a middle portion of the rear cap part, and an inner wall of the flow guiding channel is in contact fit with the mating cambered surfaces.

Preferably, a groove for receiving the support ribs is provided on the cap bottom of the rear cap part, the female-end elastic member abuts against bottom of the rear cap part.

To achieve the third object, the present application further provides a fluid connector. The fluid connector includes the female-end structure as mentioned above, and a male-end structure. The male-end structure includes a male-end body, a male-end piston and a male-end elastic member. A front end of the male-end body has a front interface part matched with the female-end interface annular gap of the female-end structure, and a rear enlarged hole is formed at a rear inner side of the front interface part so as to form a clearance for flow of fluid when the rear enlarged hole moves to the female-end interface annular gap. The male-end piston is movably connected to the male-end body via the male-end elastic member. Since the female-end structure has the advantages mentioned above, the fluid connector including the female-end structure also has the corresponding advantages.

Preferably, it further includes a first locking ball connected to the female-end body of the female-end structure in such a manner as to be movable laterally, a sliding sleeve connected to the female-end body in such a manner as to be slidable in a forward and backward direction, and a locking elastic member configured to prevent the sliding sleeve from moving away from a locking position. A locking groove is provided on an outer side of the male-end body and configured to be engaged with the first locking ball. The sliding sleeve is configured to prevent the first locking ball from disengaging from the locking groove when being in the locking position and to enable the first locking ball to be disengaged from the locking groove when the sliding sleeve slides relative to the female-end body and moves away from the locking position.

Preferably, it further includes a second locking ball connected to the female-end body in such a manner as to be movable laterally. The second locking ball abuts against an inner guiding inclined surface of the sliding sleeve when the sliding sleeve is in the locking position. A pushing inclined surface is provided on the male-end body in front of the locking groove, and configured to push the second locking ball to move laterally and outwardly when the pushing inclined surface moves into the female-end body. The second locking ball moving laterally and outwardly can push the inner guiding inclined surface to move forwards or backwards so that the sliding sleeve moves away from the locking position.

Preferably, the male-end piston includes a male-end front column part and a male-end rear stem part being coaxial with the male-end front column part. A plurality of projecting plate parts are evenly arranged in a circumferential direction on the male-end rear stem part and extend radially. An outer edge of each of the projecting plate parts is in contact fit with the rear enlarged hole.

Preferably, the male-end rear stem part is connected to the male-end front column part via a flow guiding circular truncated cone part so as to form a continuous convergence; and a front end of each of the projecting plate parts contacts and is connected with the flow guiding circular truncated cone part.

Preferably, the male-end rear stem part has a rear end in a conical structure for guiding flow of fluid.

To achieve the fourth object, the present application further provides a male-end piston of a fluid connector. The male-end piston includes a male-end front column part and a male-end rear stem part being coaxial with the male-end front column part. A plurality of projecting plate parts are evenly arranged on the male-end rear stem part in a circumferential direction and extend radially. Outer edges of the projecting plate parts are located on a same cylindrical surface.

Preferably, the male-end rear stem part is connected to the male-end front column part via a circular truncated cone part so as to form a continuous convergence; and a front end of each of the projecting plate parts contacts and is connected with the circular truncated cone part.

Preferably, the male-end rear stem part has a rear end in a conical structure for guiding flow of fluid.

Preferably, a stepped surface is formed on each of the projecting plate parts. The stepped surfaces of the projecting plate parts are located on a same cylindrical surface, and the male-end elastic member is arranged on the stepped surfaces.

Preferably, each of the projecting plate parts has a thickness gradually decreased outwardly in a radial direction.

BRIEF DESCRIPTION OF THE DRAWINGS

Hereinafter, in order to more clearly illustrate the technical solutions in the embodiments of the present invention or in the prior art, the accompanying drawings that need to be used in the description of the embodiments or the prior art will be briefly introduced. It will be obvious that the accompanying drawings in the following description are only some of the embodiments of the present application, and other drawings can be obtained according to these accompanying drawings by those skilled in the art without creative efforts.

REFERENCE NUMERALS IN THE ACCOMPANYING DRAWINGS

| | |
|---|---|
| 100 female-end structure, | 200 male-end structure; |
| 1 female-end body, | 2 female-end valve sleeve, |
| 3 female-end valve stem, | 4 female-end elastic member, |
| 5 male-end body, | 6 male-end piston, |
| 7 male-end elastic member, | 8 first sealing ring, |

-continued

| | |
|---|---|
| 9 first locking ball, | 10 second locking ball, |
| 11 sliding sleeve, | 12 locking elastic member, |
| 13 second sealing ring; | |
| 1-1 rear cap part, | 1-2 butt tube, |
| 2-1 sealing part, | 3-1 female-end front column part, |
| 3-2 female-end rear stem part, | 3-3 flattered part, |
| 3-4 support rib, | 5-1 front cylindrical part, |
| 5-2 rear enlarged hole, | 5-3 front interface part, |
| 5-4 locking groove, | 5-5 pushing inclined surface, |
| 6-1 male-end front column part, | 6-2 male-end rear stem part, |
| 6-3 projecting plate part, | 6-4 flow guiding circular truncated cone part, |
| 11-1 inner guiding inclined surface; | |
| 3-3-1 mating cambered surface. | |

The direction indicated by arrow is the direction in which fluid flows.

The direction indicated by arrow is the direction in which fluid flows.

DETAILED DESCRIPTION

The embodiments of the present application provide a female-end valve stem of a fluid connector which can effectively solve the problem of poor flow guide effect at connection of the rear end of the female-end stem.

Hereinafter, the technical solutions in the embodiments of the present application will be clearly and completely described with reference to the accompanying drawings in the embodiments of the present application. It is clear that the embodiments described are only a part of the embodiments of the present application, and not all of the embodiments. Based on the embodiments of the present application, all other embodiments obtained by a person of ordinary skill in the art without creative efforts fall within the scope of protection of the present application.

Figure 1:
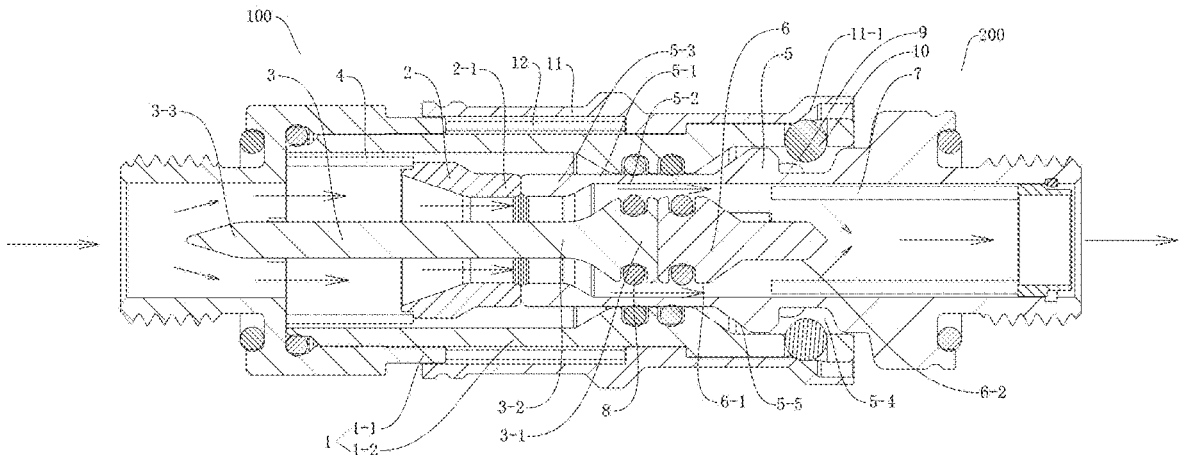
FIG. 1 is a schematic structural view of a fluid connector after butt connection according to some embodiments of the present application.
Figure 2:
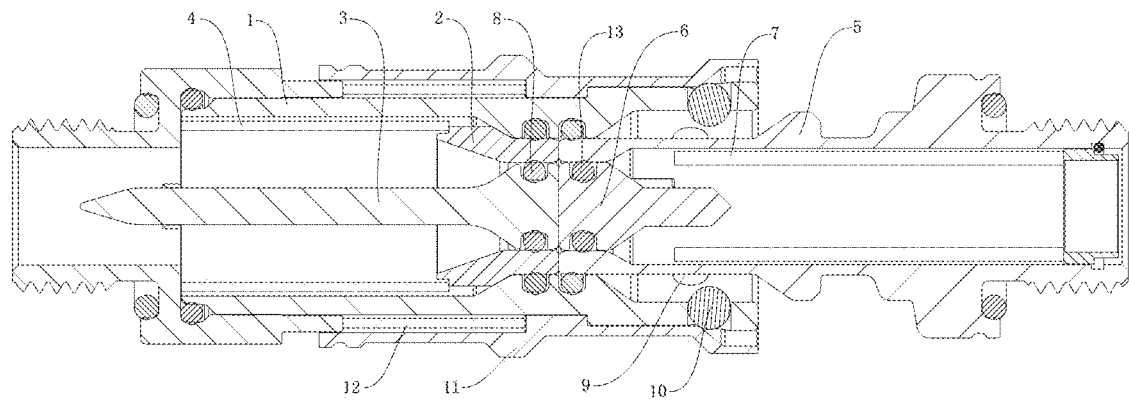
FIG. 2 is a schematic structural view of the fluid connector before butt connection according to some embodiments of the present application.
Figure 3:
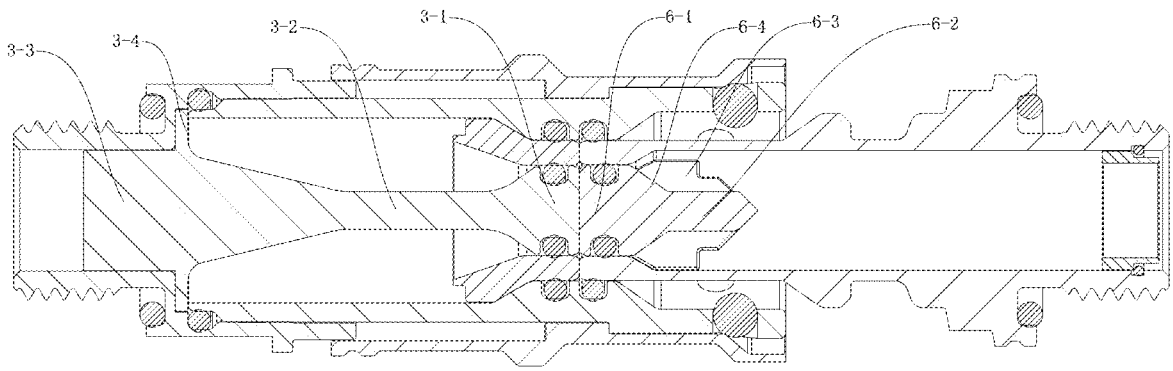
FIG. 3 is a schematic top sectional structural view of the fluid connector in FIG. 2.
Figure 4:
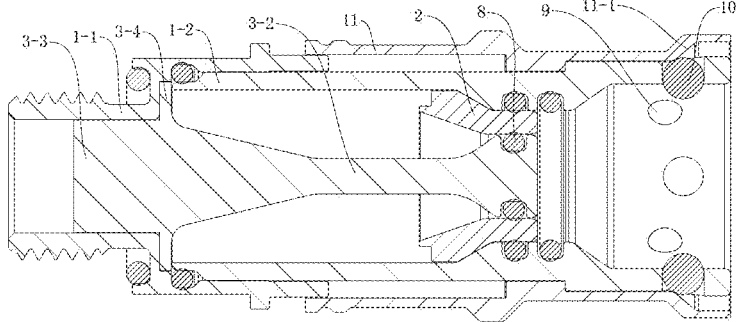
FIG. 4 is a schematic structural view of a female-end structure provided according to some embodiments of the present application.
Figure 5:
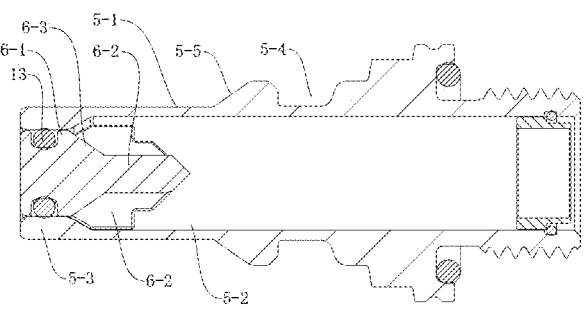
FIG. 5 is a schematic structural view of a male-end structure provided according to some embodiments of the present application.
Figure 6:
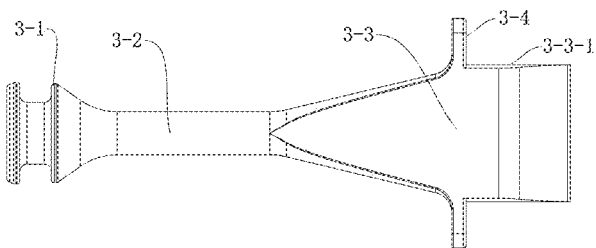
FIG. 6 is a schematic structural view of a female-end valve stem of a fluid connector provided according to some embodiments of the present application.
Figure 7:
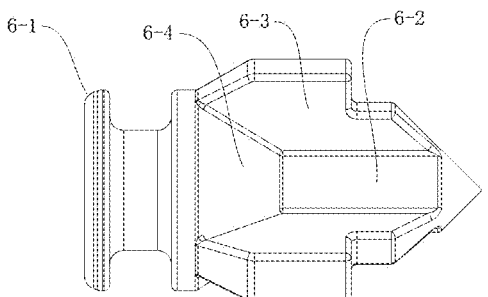
FIG. 7 is a schematic structural view of a male-end piston of a fluid connector provided according to some embodiments of the present application.
Figure 8:
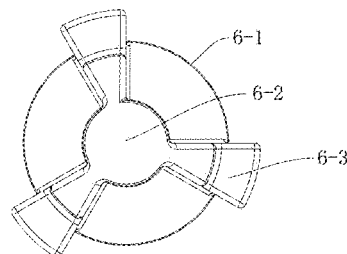
FIG. 8 is a schematic right structural view of the male-end piston in FIG. 7.

Reference is made to FIGS. 1 to 8. FIG. 1 is a schematic structural view of a fluid connector after butt connection according to some embodiments of the present application; FIG. 2 is a schematic structural view of the fluid connector before butt connection according to some embodiments of the present application; FIG. 3 is a schematic top sectional structural view of the fluid connector in FIG. 2; FIG. 4 is a schematic structural view of a female-end structure provided according to some embodiments of the present application; FIG. 5 is a schematic structural view of a male-end structure provided according to some embodiments of the present application; FIG. 6 is a schematic structural view of a female-end valve stem of a fluid connector provided according to some embodiments of the present application; FIG. 7 is a schematic structural view of a male-end piston of a fluid connector provided according to some embodiments of the present application; and FIG. 8 is a schematic right structural view of the male-end piston in FIG. 7.

As shown in FIGS. 1 to 3, there is provided a fluid connector, which may specifically be a fluid connector with low pressure drop. FIG. 1 is a schematic structural view of a fluid connector after butt connection according to some embodiments of the present application; FIG. 2 is a schematic structural view of the fluid connector before butt connection according to some embodiments of the present application; and FIG. 3 is a schematic top sectional structural view of the fluid connector in FIG. 2. The fluid connector includes a female-end structure 100 and a male-end structure 200. Before butt connection between the male-end structure 200 and the female-end structure 100, their interfaces are closed; and after the butt connection is finished, their internal movable components are pushed to move to enable the respective interfaces to be opened so as to complete the butt connection.

In some embodiments, the female-end structure 100 mainly includes a female-end body 1, a female-end valve sleeve 2, a female-end valve stem 3 and a female-end elastic member 4. The female-end valve stem 3 is fixed in the female-end body 1, whereas the female-end valve sleeve 2 is movable in the female-end body 1, with the female-end elastic member 4 being arranged between the female-end body 1 and the female-end valve sleeve 2.

The female-end valve stem 3 is provided with a female-end front column part 3-1 and a female-end rear stem part 3-2 at the end thereof. The diameter of the female-end front column part 3-1 is larger than the diameter of the female-end rear stem part 3-2. An inner hole of a sealing part 2-1 of the female-end valve sleeve 2 is matched with the outer diameter of the female-end front column part 3-1 so as to achieve a sealing contact therebetween. An outer wall of the sealing part 2-1 is matched with the interface of the female-end body 1 so as to achieve a sealing contact therebetween. That is, a female-end interface annular gap is formed between the female-end front column part 3-1 and the interface of the female-end body 1. When sealing is carried out, the sealing part 2-1 of the female-end valve sleeve 2 is filled in the female-end interface annular gap so as to achieve sealing. When an external force is applied to the female-end valve sleeve 2, the female-end elastic member 4 is pushed to deform and move backwards, i.e., move out of the female-end interface annular gap, so that the sealing part 2-1 is located radially outside of the female-end rear stem part 3-2. At this moment, since the outer diameter of the female-end rear stem part 3-2 is smaller than the inner diameter of the sealing part 2-1, a passage is formed therebetween to allow flow of fluid. And, since the female-end interface annular gap is opened, the female-end interface annular gap is communicated to the rear connecting port via the passage formed at the stem part.

In some embodiments, the male-end structure 200 includes a male-end body 5, a male-end piston 6 and a male-end elastic member 7. The male-end piston 6 is movably arranged in the male-end body 5. The male-end elastic member 7 is configured to prevent the male-end piston 6 from moving inwards, i.e., prevent the male-end piston 6 from being separated from the interface of the male-end body 5. The male-end body 5 includes a front cylindrical part 5-1 having an outer diameter matched with the interface of the front cylindrical part 5-1 as well as the interface of the female-end body 1 so as to achieve a sealing contact. Also, the outer diameter of the front cylindrical part 5-1 is the same as the outer diameter of the sealing part 2-1. The portion of the front cylindrical part 5-1 at the inner side of the interface is counterbored to form a rear enlarged hole 5-2. The diameter of the rear enlarged hole 5-2 is larger than the outer diameter of the female-end front column part 3-1, so that a clearance is formed between the rear enlarged hole 5-2 and the female-end front column part 3-1 to allow flow of fluid when the rear enlarged hole 5-2 is located radially outside of the female-end front column part 3-1. The male-end front column part 6-1 of the male-end piston 6 is matched with the interface of the front cylindrical part 5-1, so that the male-end front column part 6-1 can seal the interface of the front cylindrical part 5-1. When the male-end piston 6 moves inwards, the male-end elastic member 7 is elastically deformed to store energy, and the male-end front column part 6-1 enters the rear enlarged hole 5-2. Since the rear enlarged hole 5-2 has a larger diameter, a clearance is formed between the rear enlarged hole 5-2 and the male-end front column part, so that the fluid upstream of the male-end piston 6 may be communicated with the fluid downstream of the male-end piston 6 via the clearance.

In some embodiments, as shown in FIG. 2, the status of the female-end structure 100 and the status of the male-end structure 200 before butt connection are as follows. In the female-end structure 100, the female-end elastic member 4 biases the female-end valve sleeve 2 to move forward into the female-end interface annular gap formed between the female-end front column part 3-1 and the interface of the female-end body 1 so as to achieve sealing. That is, the outer wall of the sealing part 2-1 of the female-end valve sleeve 2 and the inner wall of the interface of the female-end body 1 are in sealing contact, and the inner wall of the sealing part 2-1 and the outer wall of the female-end front column part 3-1 are in sealing contact. The sealing contact in the context may be either direct sealing contact or indirect sealing contact achieved by a sealing ring. In the male-end structure 200, the male-end elastic member 7 pushes the male-end piston 6 to move to the interface of the front cylindrical part 5-1. At this moment, the male-end front column part 6-1 of the male-end piston 6 is received in the interface. The outer wall of the male-end front column part 6-1 and the inner wall of the interface are in sealing contact, thereby achieving a sealing connection therebetween.

As shown in FIG. 1, the butt connection has been completed. That is, when the butt connection is carried out, the male-end structure 200 is pushed to move into the female-end structure 100. The male-end structure 200 and the female-end structure 100 are generally required to be coaxially arranged. During forward movement, the male-end piston 6 abuts against the female-end valve stem 3 and thus cannot move relative to the female-end body 1, and the female-end valve sleeve 2 is pushed by the front cylindrical part 5-1 of the male-end body 5 to overcome the elastic force of the female-end elastic member 4, so that the female-end valve sleeve 2 moves forwards relative to the female-end body 1. The male-end elastic member 7 will be prevented from moving forwards by the male-end piston 6, and thus the male-end body 5 will force the male-end elastic member 7 to elastically deform, so that the male-end body 5 can continue to move towards the female-end body 1. As the male-end body 5 moves forwards, the front interface part enters the female-end interface annular gap, so that the interface part of the male-end body 5 can seal the female-end interface annular gap. Then, the male-end body 5 continues to move forwards, until the rear enlarged hole 5-2 is located at the female-end front column part 3-1 and the interface part of the male-end body 5 is located at the female-end rear stem part 3-2. At the moment, since the diameter of the rear enlarged hole 5-2 is larger than the inner diameter of the female-end front column part 3-1, a gap is formed therebetween; and since the inner diameter of the interface part of the male-end body 5 is larger than the outer diameter of the female-end rear stem part 3-2, a gap is formed therebetween. Thus, the interior of the female-end structure 100 and the interior of the male-end structure 200 are communicated, finishing the butt connection.

In some embodiments, reference may be made to FIGS. 1 to 6. FIG. 6 is a schematic structural view of a female-end valve stem of a fluid connector provided according to some embodiments of the present application. The female-end valve stem of the fluid connector includes a female-end rear stem part 3-2, a female-end front column part 3-1, a flattened part 3-3 and a support rib 3-4.

The outer profile of the female-end front column part 3-1 as mentioned above is matched with the inner side surface of the sealing part 2-1 of the female-end valve sleeve 2 so as to achieve a sealing contact. The mating surfaces may be cylindrical surfaces or cambered surfaces such that the female-end interface annular gap is formed between female-end front column part 3-1 and the interface of the female-end body 1. Alternatively, the mating surfaces on the both sides of the female-end interface annular gap may be serrated surfaces or in other structures, or the cross section of the female-end interface annular gap may be in a triangular shape or in other irregular shapes.

The female-end rear stem part 3-2 is arranged at the rear end of the female-end front column part 3-1. The cross section of the female-end rear stem part 3-2 is smaller than the cross section of the female-end front column part 3-1 so that a communication channel may be formed to communicate with the female-end interface annular gap when the sealing part 2-1 moves to the female-end rear stem part 3-2. There may be two methods for forming the gap. In one method, the cross-section profile of the female-end rear stem part 3-2 is smaller than the cross-section profile of the female-end front column part 3-1 such that the gap is formed between the sealing part 2-1 and the female-end rear stem part 3-2 to serve as the communication channel for communicating with the female-end interface annular gap. In the other method, the female-end rear stem part 3-2 is provided with a groove or hole as the communication channel, which extends to the rear port at the rear side of the female-end structure 100 and has an opening at the female-end front column part 3-1 such that the opening communicates with the female-end interface annular gap when the sealing part 2-1 moves backwards to the female-end rear stem part 3-2.

A flattened part 3-3 for guiding fluid to flow forwards may be provided at the rear end of the female-end rear stem part 3-2. Fluid flowing from back to front is guided by the flattened part 3-3 to flow into the communication channel. That is, the fluid introduced through an opening at the other end of the female-end body 1 flows to the flattened part 3-3, and then is guided by any or both of the side surfaces of the flattened part 3-3 in the thickness direction so as to reduce the fluid resistance.

In some embodiments, support ribs 3-4 are provided on both sides of the flattened part 3-3 in the width direction and extend laterally to be fixedly connected to the female-end body 1. That is, the whole female-end valve stem 3 is fixedly connected to the female-end body 1 by the support ribs 3-4, so as to ensure that it is in the desired position, and thus ensure the shape and positional stability of the female-end interface annular gap as well as the subsequent butt connection between the male-end structure 200 and the female-end structure 100 and the sealing contact between the sealing part 2-1 and the female-end front column part 3-1.

In some embodiments, the female-end valve stem 3 may be connected without using the support ribs 3-4. For example, the female-end valve stem 3 and the female-end body 1 may be connected by welding or integrally formed. For example, the both sides of the flattened part 3-3 in the width direction may be welded to the female-end body 1 or integrally formed with the female-end body 1.

When the female-end valve stem 3 of the fluid connector provided in some embodiments is used, since the female-end rear stem part 3-2 is provided with the flattened part 3-3 so that the both side surfaces of the flattened part 3-3 in the thickness direction may be used for flow guiding and the support ribs 3-4 of the flattened part 3-3 on both sides in the width direction may be used for fixing, the support ribs 3-4 on both sides in the width direction do not interfere with the flow of the fluid, thereby wholly ensuring the fluid flow performance. Therefore, by providing the flattened part 3-3 with the two side surfaces in thickness direction for flow guiding and the support ribs connected on the side edges in the width direction for fixing, this female-end valve stem 3 has a very good flow guiding effect while ensuring fixation. In summary, the female-end valve stem 3 of the fluid connector is able to effectively solve the problem of poor flow guiding effect at connection of the rear end of the female-end valve stem 3.

In some embodiments, the structure of the front end of the female-end valve stem 3, i.e., the structure of the female-end rear stem part 3-2 and the female-end front column part 3-1 may be designed as needed, and the rear end of the female-end valve stem 3 may have the flattened part 3-3 and the support ribs 3-4, specifically, the flattened part 3-3 having two side surfaces in the thickness direction for flow guiding, and the support ribs 3-4 connected on two sides in the width direction respectively.

In some embodiments, to facilitate positioning the whole female-end valve stem 3 by the flattened part 3-3 to ensure precision of the mounting position of the female-end valve stem 3, mating cambered surfaces 3-3-1 may be formed on the two sides of the flattened part 3-3 in the width direction and behind the support ribs 3-4. The mating cambered surfaces 3-3-1 on the two sides of the flattened part 3-3 may be on a same cylindrical surface, and may be coaxial with the female-end front column part 3-1. The both ends of at least one diameter of the cylindrical surface are respectively located in the middle of the mating cambered surfaces 3-3-1 on both sides, so as to ensure that the mating cambered surfaces 3-3-1 on both sides can be matched with a corresponding cylindrical hole and are radially limited to be fixed to each other. Preferably, the mating cambered surfaces 3-3-1 on both sides are symmetrical about the center thereof.

In the female-end valve stem provided in some embodiments, to ensure smooth flow of fluid and strength, the portion of the flattened part 3-3 in front of the support ribs 3-4 may have a constant thickness and a width gradually reduced so that the end with smallest width is connected to the female-end rear stem part 3-2. The two sides of the flattened part 3-3 in the width direction are gradually close to each other so as to guide flow, and the constant thickness may fully ensure that the spaces on both sides in the thickness direction are sufficient to hold fluid. The thickness of the portion of the flattened part 3-3 in front of the support ribs 3-4 may be equal to the diameter of the female-end rear stem part 3-2.

In the female-end valve stem provided in some embodiments, in order to make the flattened part 3-3 have a better flow guiding effect, the flat surfaces of the flattened part on the both sides in the thickness direction may be converged in the rearward direction until they merge with each other. Further, the portions, which are located at the back of the support ribs 3-4, of the flat surfaces of the flattened part on the both sides in the thickness direction may be converged in the rearward direction until they merge with each other. In this way, when the fluid flows to the rear end of the female-end valve stem 3, it starts to be guided by the flat surfaces of the flattened part 3-3 on both sides, and is gradually guided until it reaches the portion of the flattened part 3-3 connected to the support rib 3-4. Thereafter, the flattened part 3-3 does not need to guide flow of the fluid.

In the female-end valve stem provided in some embodiments, in order to ensure the engaging and sealing effect between the sealing part 2-1 and the female-end front column part 3-1, an annular groove may be provided on the side surface of the female-end front column part 3-1 for receiving a first sealing ring 8.

In some embodiments, as shown in FIG. 4, a female-end structure 100 of a fluid connector is provided, and includes a female-end body 1, a female-end valve sleeve 2, a female-end elastic member 4, and the female-end valve stem 3 in any of the embodiments mentioned above. The female-end valve stem 3 is connected to the female-end body 1, and a female-end interface annular gap is formed between the female-end front column part 3-1 of the female-end valve stem 3 and the interface of the female-end body 1. The female-end valve sleeve 2 is movably arranged in the female-end body 1 and is connected to the female-end body 1 via the female-end elastic member 4. The female-end valve sleeve 2 has a sealing part 2-1 matched with the female-end interface annular gap. The female-end elastic member 4 may be a compression spring, or may be an extension elastic member, which can drive the sealing part 2-1 of the female-end valve sleeve 2 to move into the female-end interface annular gap.

In the female-end structure 100 provided in some embodiments, In order to better center the female-end valve stem 3, the portion of the female-end valve stem 3 at the rear side of the support ribs 3-4 may be engaged with the inner wall surface of the female-end body 1 for lateral positioning. That is, it can ensure that the female-end valve stem 3 and the female-end body 1 are laterally fixed relative to each other through the above-mentioned engagement, both in the width direction of the flattened part and in the thickness direction of the flattened part. In some embodiments, the mating cambered surfaces 3-3-1 on both sides of the flattened part 3-3 of the female-end valve stem 3 may be engaged with and contact the inner wall surface of the female-end body 1, so as to create rotational fit therebetween. As mentioned above, the spacing distance between the mating cambered surfaces 3-3-1 on both sides in the width direction is the diameter of the mating cambered surfaces 3-3-1, so that it is possible to center them by engagement and contact.

In the female-end structure 100 provided in some embodiments, in order to facilitate mounting of the female-end valve stem 3, the female-end body 1 includes a rear cap part 1-1 and a butt tube 1-2 detachably connected to the rear cap part 1-1. The butt tube 1-2 is provided therein with an interface. The female-end valve sleeve 2 is disposed in the butt tube 1-2, that is, the butt tube 1-2 is arranged outside female-end valve sleeve 2. The front end of the rear cap part 1-1 is arranged on the butt tube 1-2. The both may be connected through threaded engagement or snap fit. The support ribs may be fixedly clamped between the cap bottom of the rear cap part 1-1 and the butt tube 1-2, that is, the rear cap part 1-1 and the butt tube 1-2 may apply forces to the support ribs 3-4 from the front and rear sides so as to effectively prevent the support ribs 3-4 from moving forward or rearward. Further, by engagement and contact of the mating cambered surface 3-3-1, the female-end valve stem 3 can only rotate about its axis. If the female-end front column part 3-1 is cylindrical, the rotation of the female-end valve stem 3 cannot affect the sealing adversely. Of course, the other structures may be used to define the rotation about axis. A flow guiding channel is provided at the middle portion of the rear cap part 1-1, and has an inner wall engaged with and contacting the mating cambered surfaces 3-3-1. Further, a groove for receiving the support ribs 3-4 may be provided at the cap bottom of the rear cap part 1-1 and/or the rear end face of the butt tube 1-2. To better ensure the engagement, it is preferred to provide the groove for receiving the support ribs 3-4 at the cap bottom of the rear cap part 1-1. The female-end elastic member 4 may abut against the bottom of the rear cap part 1-1.

As shown in FIGS. 1 to 5, in the fluid connector provided in some embodiments, it is provided with the male-end structure 200 mentioned above, and includes the female-end structure 100 in any of the embodiments mentioned above, or includes the female-end valve stem 3 in any of the embodiments mentioned above. The male-end structure 200 of the fluid connector includes a male-end body 5, a male-end piston 6 and a male-end elastic member 7. The front end of the male-end body 5 has a front interface part 5-3 matched with the female-end interface annular gap of the female-end structure 1, that is, the front interface part 5-3 is the front portion of the front cylindrical part 5-1. The rear enlarged hole 5-2 is formed at the rear side of the front interface part 5-3, so as to form a gap for fluid flow between the rear enlarged hole 5-2 and the female-end front column part 3-1 when the rear enlarged hole 5-2 moves to the female-end interface annular gap. The male-end piston 6 is movably connected in the male-end body 5 via the male-end elastic member 7. When the front interface part 5-3 moves into the female-end interface annular gap, the male-end piston 6 cannot move forwards under pushing of the female-end front column part 3-1 of the female-end valve stem 3. As a result, the male-end body 5 is moved forwards relative to the male-end piston 6, and the male-end elastic member 7 is compressed.

In the fluid connector provided in some embodiments, it may further includes a first locking ball 9, a sliding sleeve 11 and a locking elastic member 12. The first locking ball 9 is connected to the female-end body 1 of the female-end structure 100 in such a manner as to be movable laterally. That is, the first locking ball 9 may be moves laterally in the female-end body 1 into or out of the locking groove 5-4. The sliding sleeve 11 is connected to the female-end body 1 in such a manner as to be slidable forwards or backwards into or out of a locking position. When the sliding sleeve 11 is in the locking position, the first locking ball 9 is prevented from moving out of a locking groove 5-4. The locking elastic member 12 is configured to prevent the sliding sleeve 11 from disengaging from the locking position. When the sliding sleeve 11 is disengaged from the locking position, the locking elastic member 12 is elastically deformed. When the external forced is removed from the sliding sleeve 11, the locking elastic member 12 pushes the sliding sleeve 11 into the locking position. The locking elastic member 12 may be a spring or the like, specifically a compression spring or an extension spring for example.

The locking groove 5-4 is provided on the outer side of the male-end body 5 and is engaged with the first locking ball 9. When the male-end structure 200 and the female-end structure 100 are connected end to end, the first locking ball 9 may move into the locking groove 5-4. After the first locking ball 9 enters the locking groove 5-4, the male-end body 5 and the female-end body 1 are relatively fixed in the forward and backward direction, so that the male-end structure 200 and the female-end structure 100 cannot be disengaged from each other. When being in the locking position, the sliding sleeve 11 can prevent the first locking ball 9 from moving out of the locking groove 5-4. When the sliding sleeve 11 slides relative to the female-end body 1 to move away from the locking position, the first locking ball 9 can disengage from the locking groove 5-4, so that the male-end structure 200 and the female-end structure 100 can be detached, that is, the male-end body 5 can disengage from the female-end body 1.

In the fluid connector provided in some embodiments, in order to facilitate automatic butt connection, the sliding sleeve 11 does not need to be operated separately during butt connection. Preferably, it further includes a second locking ball 10 which is connected to the female-end body 1 in such a manner as to be movable laterally. When the sliding sleeve 11 is in the locking position, an inner guiding inclined surface 11-1 of the sliding sleeve 11 abuts against the second locking ball 10. A pushing inclined surface 5-5 is provided on the male-end body 5 in front of the locking groove 5-4. When the pushing inclined surface 5-5 moves into the female-end body 1, it can push the second locking ball 10 to move laterally an outwardly. When the second locking ball 10 moves laterally an outwardly, it can push the inner guiding inclined surface 11-1 to move in the forward and backward direction so that the sliding sleeve 11 moves away from the locking position. Therefore, the first locking ball 9 can move out of the locking groove 5-4.

As shown in FIGS. 1 to 2, the sliding sleeve 11 is arranged on the outer side of the butt tube 1-2 and is sliding fit with the butt tube 1-2. The locking elastic member 12 is arranged on the outer side of the butt tube 1-2 and is located on the inner side of the sliding sleeve 11. One end of the locking elastic member 12 abuts against the inner shoulder of the sliding sleeve 11, and the other end abuts against the front end of the rear cap part 1-1. A conical surface is formed on the inner side of the front end of the sliding sleeve 11 as the inner guiding inclined surface 11-1. Multiple first locking balls 9 and multiple second locking balls 10 are arranged evenly in the circumferential direction of the female-end body 1.

During insertion of the male-end structure 200, the second locking ball 10 pushes the inner guiding inclined surface 11-1 of the sliding sleeve 11, causing the sliding sleeve 11 to move backwards to unlock the first locking ball 9. When the male-end structure 200 continues to move forwards, the female-end valve sleeve 2 moves backwards, and the front interface part 5-3 enters the butt tube 1-2. When insertion of the male-end structure 200 into the male-end structure 100 is finished, and the second locking ball 10 and first locking ball 9 are released, the groove on the outer side of the front cylindrical part 5-1 is aligned with the first locking ball 9. Then, the first locking ball 9 falls back into the locking groove 5-4 on the outer side of the front cylindrical part 5-1, and the sliding sleeve 11 moves forwards along the female-end body 1 under the elastic force of the locking elastic member 12, runs across the first locking ball 9, and slides to the locking position where the first locking ball 9 is blocked from disengaging from the male-end, achieving self-locking.

During detachment, the sliding sleeve 11 is moved backwards by hand until the opening of the sliding sleeve 11 moves away from the first locking ball 9 to unlock the first locking ball 9. The female-end elastic member 4 pushes the female-end valve sleeve 2 and the male-end body 5 to move backwards, so that the male-end body 5 moves away from the female-end. After the female-end and the male-end are separated from each other, they are self-sealed individually, and the locking elastic member 12 pushes the sliding sleeve 11 to move forwards and cover the first locking ball 9, such that the inner guiding inclined surface 11-1 stops at the second locking ball 10.

As shown in FIGS. 1, 2, 3, 5, 7, 8, in the fluid connector provided in some embodiments, the male-end piston 6 may include the male-end front column part 6-1 and the male-end rear stem part 6-2 being coaxial with the male-end front column part 6-1. Multiple projecting plate parts 6-3 are evenly arranged in the circumferential direction of the male-end rear stem part 6-2 and extend radially from the male-end rear stem part 6-2. The outer edge of each projecting plate part 6-3 is in contact fit with the rear enlarged hole 5-2. The projecting plate parts 6-3 extending radially provide support, significantly improving the supporting effect. Alternatively, the male-end piston 6 may only include the male-end front column part 6-1 and a supporting stem part extending backwards. Multiple supporting stem parts may be arranged on the rear side of the male-end front column part 6-1 and arranged evenly in the circumferential direction, and may be in contact fit with the rear enlarged hole 5-2.

In the fluid connector provided in some embodiments, the male-end rear stem part 6-2 may be connected to the male-end front column part 6-1 via a flow guiding circular truncated cone part 6-4 so as to gradually converge, thereby achieving a better flow guiding effect between the male-end rear stem part 6-2 and the male-end front column part 6-1. Preferably, the front end of the projecting plate part 6-3 is connected to and contacts the flow guiding circular truncated cone part 6-4, ensuring a strong connecting strength of the projecting plate part 6-3.

In the fluid connector provided in some embodiments, in order to achieve a better flow guiding effect, the rear end of the male-end rear stem part 6-2 may be conical to guide flow of fluid.

As shown in FIGS. 7 to 8, in the male-end structure provided in some embodiments, the male-end piston includes the male-end front column part 6-1 and the male-end rear stem part 6-2 being coaxial with the male-end front column part 6-1. Multiple projecting plate parts 6-3 are arranged on the male-end rear stem part 6-2 evenly in the circumferential direction and extend radially. The outer edges of the projecting plate parts 6-3 are located on a same cylindrical surface, or may be engaged with the inner wall of the rear enlarged hole 5-2.

In the male-end piston of the male-end structure provided in some embodiments, the male-end rear stem part 6-2 and the male-end front column part 6-1 are connected via the flow guiding circular truncated cone part 6-4 so as to continuously converge, and the front end of the projecting plate part 6-3 is connected to and contacts the circular truncated cone part.

In the male-end piston of the male-end structure provided in some embodiments, the rear end of the male-end rear stem part 6-2 is in a conical structure for guiding flow of fluid.

In the male-end piston of the male-end structure provided in some embodiments, a stepped surface is formed on each projecting plate part 6-3, and the stepped surfaces of the projecting plate parts 6-3 are on a same cylindrical surface, so that the male-end elastic member 7 may be arranged on the stepped surface.

In the male-end piston of the male-end structure provided in some embodiments, the thickness of the projecting plate part 6-3 is gradually decreasing in the radial outward direction, ensuring a better flow guiding space.

In the male-end piston of the male-end structure provided in some embodiments, the male-end front column part 6-1 may be provided with an annular groove for receiving a second sealing ring 13 to seal the inner hole of the front interface part 5-3.

It should be noted that the forward and backward direction means the direction of butt connection. The direction of the male-end structure facing the female-end structure is the forward direction, and the direction of the female-end structure facing the male-end structure is the foreword direction.

In this specification, the embodiments are described in a progressive manner. Each embodiment focuses on the differences from the other embodiments, and the same and similar parts of the embodiments may be referred to each other.

The foregoing description of the disclosed embodiments enables those skilled in the art to realize or use the present invention. Various modifications to these embodiments will be obvious to those skilled in the art, and the general principles defined herein may be realized in other embodiments without departing from the spirit or scope of the present invention. Accordingly, the present invention will not be limited to these embodiments shown herein, but will be in accord with the widest range consistent with those principles and novel features disclosed herein.

What is claimed is:

1. A female-end valve stem of a fluid connector, comprising a female-end rear stem part and a female-end front column part arranged at a front end of the female-end rear stem part, wherein a flattened part is provided at a rear end of the female-end rear stem part and has flat surfaces on both sides in a thickness direction, a thickness of the flattened part decreases gradually in a rearward direction to guide fluid to flow in a forward direction.

2. The female-end valve stem of the fluid connector according to claim 1, wherein support ribs extend laterally from both sides of the flattened part in a width direction, and are configured to be fixedly connected to a female-end body.

3. The female-end valve stem of the fluid connector according to claim 2, wherein mating cambered surfaces are formed on the both sides of the flattened part in the width direction and at a rear side of the support ribs; the mating cambered surfaces are located on a same cylindrical surface and located at both ends in a radial direction respectively, and are coaxial with the female-end front column part.

4. The female-end valve stem of the fluid connector according to claim 3, wherein a portion of the flattened part at a front side of the support ribs has a width gradually decreased and a constant thickness.

5. The female-end valve stem of the fluid connector according to claim 1, wherein an annular groove is provided on a side surface of the female-end front column part to receive a sealing ring.

6. A female-end structure of a fluid connector, comprising a female-end body, a female-end valve sleeve, a female-end elastic member, and the female-end valve stem according to claim 2, wherein the female-end valve stem is connected to the female-end body, a female-end interface annular gap is formed between the female-end front column part of the female-end valve stem and an interface of the female-end body, the female-end valve sleeve is movably arranged in the female-end body and connected to the female-end body via the female-end elastic member, the female-end valve sleeve has a sealing part matched with the female-end interface annular gap.

7. The female-end structure of the fluid connector according to claim 6, wherein mating cambered surfaces are formed on the both sides of the flattened part of the female-end valve stem in the width direction and at a rear side of the support ribs and are in contact fit with an inner wall surface of the female-end body, and are centered by the contact fit.

8. The female-end structure of the fluid connector according to claim 7, wherein the female-end body comprises a rear cap part and a butt tube detachably connected to the rear cap part, the butt tube is provided with an interface, the female-end valve sleeve is disposed in the butt tube, a front end of the rear cap part is arranged on the butt tube; the support ribs of the female-end valve stem are fixedly clamped between a cap bottom of the rear cap part and the butt tube; a flow guiding channel is provided at a middle portion of the rear cap part, an inner wall of the flow guiding channel is in contact fit with the mating cambered surfaces.

9. The female-end structure of the fluid connector according to claim 8, wherein a groove for receiving the support ribs is provided on the cap bottom of the rear cap part, the female-end elastic member abuts against bottom of the rear cap part.

10. A fluid connector comprising a male-end structure, and the female-end structure according to claim 6, wherein the male-end structure comprises a male-end body, a male-end piston and a male-end elastic member, a front end of the male-end body has a front interface part matched with the female-end interface annular gap of the female-end structure, a rear enlarged hole is formed at a rear inner side of the front interface part so as to form a clearance for flow of fluid when the rear enlarged hole moves to the female-end interface annular gap, the male-end piston is movably connected to the male-end body via the male-end elastic member.

11. The fluid connector according to claim 10, further comprising a first locking ball connected to the female-end body of the female-end structure in such a manner as to be movable laterally, a sliding sleeve connected to the female-end body in such a manner as to be slidable in a forward and backward direction, and a locking elastic member configured to prevent the sliding sleeve from moving away from a locking position, wherein a locking groove is provided on an outer side of the male-end body and configured to be engaged with the first locking ball; the sliding sleeve is configured to prevent the first locking ball from disengaging from the locking groove when being in the locking position and to enable the first locking ball to be disengaged from the locking groove when the sliding sleeve slides relative to the female-end body and moves away from the locking position.

12. The fluid connector according to claim 11, further comprising a second locking ball connected to the female-end body in such a manner as to be movable laterally, wherein the second locking ball abuts against an inner guiding inclined surface of the sliding sleeve when the sliding sleeve is in the locking position, a pushing inclined surface is provided on the male-end body in front of the locking groove, and configured to push the second locking ball to move laterally and outwardly when the pushing inclined surface moves into the female-end body, the second locking ball moving laterally and outwardly can push the inner guiding inclined surface to move forwards or backwards so that the sliding sleeve moves away from the locking position.

13. The fluid connector according to claim 10, wherein the male-end piston comprises a male-end front column part and a male-end rear stem part being coaxial with the male-end front column part, a plurality of projecting plate parts are evenly arranged in a circumferential direction on the male-end rear stem part and extend radially, an outer edge of each of the projecting plate parts is in contact fit with the rear enlarged hole.

14. The fluid connector according to claim 13, wherein the male-end rear stem part is connected to the male-end front column part via a flow guiding circular truncated cone part so as to form a continuous convergence; a front end of each of the projecting plate parts contacts and is connected with the flow guiding circular truncated cone part; or wherein the male-end rear stem part has a rear end in a conical structure for guiding flow of fluid.

15. The fluid connector according to claim 13, wherein the outer edges of the projecting plate parts are located on a same cylindrical surface.

16. The fluid connector according to claim 13, wherein a stepped surface is formed on each of the projecting plate parts; the stepped surfaces of the projecting plate parts are located on a same cylindrical surface, the male-end elastic member is arranged on the stepped surfaces.

17. The fluid connector according to claim 13, wherein each of the projecting plate parts has a thickness gradually decreased outwardly in a radial direction.

\* \* \* \* \*